US006853127B1

(12) United States Patent
Eccleston et al.

(10) Patent No.: US 6,853,127 B1
(45) Date of Patent: Feb. 8, 2005

(54) FIELD EMISSION CATHODE AND FIELD EMISSION DISPLAY

(75) Inventors: William Eccleston, Liverpool (GB); Gehan Anil Joseph Amaratunga, Cambridge (GB); Ismail Musa, Liverpool (GB)

(73) Assignee: The University of Liverpool, Liverpool (GB)

( * ) Notice: Subject to any disclaimer, the term of this patent is extended or adjusted under 35 U.S.C. 154(b) by 0 days.

(21) Appl. No.: 09/646,032

(22) PCT Filed: Mar. 15, 1999

(86) PCT No.: PCT/GB99/00765

§ 371 (c)(1),
(2), (4) Date: Nov. 30, 2000

(87) PCT Pub. No.: WO99/48122

PCT Pub. Date: Sep. 23, 1999

(30) Foreign Application Priority Data

Mar. 13, 1998  (GB) .............................................. 9805271

(51) Int. Cl.⁷ .................................................. H01J 1/62
(52) U.S. Cl. ......................................... 313/495; 445/46
(58) Field of Search ................................. 313/309, 495; 445/46, 50, 51

(56) References Cited

U.S. PATENT DOCUMENTS

| | | | | |
|---|---|---|---|---|
| 5,548,185 | A | * 8/1996 | Kumar et al. ................. | 313/495 |
| 5,977,718 | A | * 11/1999 | Christensen ............. | 315/169.1 |
| 6,376,973 | B1 | * 4/2002 | Blanchet-Fincher et al. ..... | 313/309 |

FOREIGN PATENT DOCUMENTS

| | | |
|---|---|---|
| EP | 399 299 A | 11/1990 |
| EP | 0 399 299 A2 * | 11/1990 |
| EP | 540 839 A | 5/1993 |
| GB | 2 233 334 A | 1/1991 |
| WO | WO 95 28742 A | 10/1995 |

OTHER PUBLICATIONS

Asano, T., et al., "Field Emission From Ion Irradiated Photoresist", *Japanese Journal of Applied Physics*, 1997, vol. 36, NR. 6B. L818–L820.

Musa, I., et al., "Ultra–Low–Threshold Field Emission From Conjugated Polymers", *Nature*, 1998, vol. 395, 362–365.

Musa, I., et al., "Analysis of Low Threshold Field–Emission From Conjugated Polymers for Displays", *International Electron Devices Meeting, Technical Digest*, 1998, 867–869.

Takahashi Toshihiko, Applicant: Richo Co. Ltd., "Patent Abstracts of Japan", Publication No. 03216998, Sep. 24, 1991; Application No. 02009785, Jan. 19, 1990.

* cited by examiner

*Primary Examiner*—David V. Bruce
*Assistant Examiner*—Jurie Yun
(74) *Attorney, Agent, or Firm*—Woodcock Washburn LLP (57) ABSTRACT

A manufacture and methods are provided for a field emission cathode and field emission display comprising a conjugated polymer material. The manufacture of the invention comprises a conjugated polymer material, which may include substituted polythiophene, polyalkylthiophene, and poly-3-octylthiophene. A polymer material layer may be formed by distributing a conjugated polymer material and a solvent onto a substrate. The solvent may be evaporated under a vacuum. The polymer layer may be molded to include projections to promote field emission. Additionally, the polymer material may be doped with an electron donor material. Methods according to the invention include the steps of forming a polymer layer comprising conjugated polymer material on a substrate, distributing a polymer solution including a solvent onto the substrate, evaporating the substrate, and shaping the surface of the polymer layer by use of a mould.

24 Claims, 6 Drawing Sheets

FIELD EMISSION CATHODE AND FIELD EMISSION DISPLAY

CROSS REFERENCE TO RELATED APPLICATION

This application is the United States national phase of PCT Application Number PCT/GB99/0076; filed Mar. 19, 1999 which claims priority under 37 CFR 119(a-d) to United Kingdom Application No. 9805271.5, filed Mar. 13, 1998.

The present invention is concerned with field emission electrodes and with field emission displays.

A great deal of research effort has be devoted in recent years to developing a display which can replace the conventional cathode may tube (CRT). Shortcomings of the CRT include its weight and bulk, and also its requirement for relatively high input power. The CRT is also unsuited to use in large area displays eg. in stadia and in small displays for laptops, watches etc.

The liquid crystal display (LCD) provides an alternative which is not subject to some of the disadvantages of the CRT. It em be manufactured in flat panel format, and used both in miniature displays an in larger displays, eg. in wide format television sets. However, LCD displays suffer from disadvantages of their own, particularly with regard to display brightness.

A promising alternative to both LCDs and CRTs is the field emission display (FED). FEDs offer the prospect of flat panel displays which are superior to LCD screens in brightness, colour rendition, response time and operating temperature range.

In known FEDS, electrons are released from a cathode by field emission (rater than by thermionic emission, as in the CRT) and accelerated toward an anode which is maintained at a positive potential typically of several kV. The electrons impinge on the phosphor pixels which are thereby caused to luminesce, providing the display. To generate the field needed for release of electrons, a matrix of switchable row and column electrodes is typically provided, in addition to the anode, and in this way pixels can be individually addressed.

A particular problem has been found in providing a cathode which exhibits field emission at electric field strengths which can be provided in a practical display, without the need for unacceptably large power and voltage.

Known FEDs typically utilize cathodes having on their surface an array of microscopic pointed elements known as Spindt tips, formed of Mo or Si. The tips are very sharp—having radii of the order of 20 nm—thereby providing large local electric fields to cause field emission. This is necessary because in the materials of such known cathodes the work function (the energy needed to release an electron from the cathode) is otherwise relatively high—or the order of 5 eV. These known cathodes are not straightforward to manufacture and suffer from reliability problems due to erosion of the field tips.

An alternative approach which has been provided is to pride a cathode lacking Spindt tips but formed of material having low (or even negative) electron affinity. Electrons may be released from such a material by relatively small electric field.

There is in almost all such field emission systems the need to electrically condition the cathode before low threshold emission is possible. Diamond like carbon (DLC) films have given high emission, particularly when doped with nitrogen. One such doped material has provided what is believed to be the lowest threshold reported at the priority date. The nature of the bonding is thought to be an important factor with diamond-like $sp^3$ bonds being appropriate for producing the energy levels associated with a low electron affinity.

Current understanding of the main features of the emission processes is incomplete, but it is believed that the density of $sp^3$ bands and the presence of hydrogen are important. An alternative model is based on a dual process which involves electron heating in the DLC conduction band due to its internal electric field and emission over the relatively low surface potential barrier (electron affinity). Nitrogen acts as a donor fostering the formation of a high field depletion region. This high field region promoters transfer of electrodes from substrate to film.

Although DLC film cathodes have hitherto been considered the most promising candidate, the result; have not been sufficiently impressive for displays based on such materials to be considered an immediate replacement for the CRT and LCD.

A first object of the present invention is to provide an improved field emission cathode.

It is desired that such a cathode should exhibit field emission when subject to an electric field of a magnitude which can be created in a practiced display.

It is additionally or alternatively desired that such a cathode should exhibit stable field emission properties.

It is additionally or alternatively desired that such a cathode should be capable of manufacture in suitable form for use in a field emission display.

In accordance with a first aspect of the present invention, there is provided a field emission cathode comprising conjugated polymer water forming a field emission surface.

The inventors have fortuitously (and most unexpectedly) discovered that polymer materials can be manufactured giving high electron emission. Polymer materials can be formed by known techniques into uniform cathodes, which may be large in area, and can be highly stable. Exclusion of oxygen is considered useful for the stability of the material.

Conjugated polymers typically have high density of free electrons. Most polymer films are p type with few free electrons; the substrates of the cathode can itself contribute electrons Such materials are known for other applications in electronics, which utilize semiconductor type properties of certain conjugated polymers. The usual applications proposed for conjugated polymers—eg. in light emitting structures, photocopiers, photodetectors and thin film transistors—do not require the material to have a low work function, and it is believed that this property of such materials ha not hitherto been utilized. The present inventors have found that some such polymeric material are capable of producing very high steady state field cession currents with the threshold field needed to initiate field mission being smaller than for any other so far reported It is especially preferred that the polymer material is a substituted polythiophene, and polyalkylthiophenes are particularly suitable. Poly -3-octylthiophene is currently the preferred martial.

The polymer material may take the form of a layer on a substrate. It is especially preferred that the polymer layer is formed as a film with thickness of the order of 5 $\mu$m.

The polymer material is preferably spun from a liquid source or is evaporated in a vacuum onto a substrate techniques which can produce a large area cathode. A light and economical cathode can be produced in this way.

It in preferable ta the polymer material should have a low barrier to electrons of the substrate on which it is formed.

The polymer material may be nitrogen with an electron donor material. The electron donor may be nitrogen (known to reduce the barrier to electrons of the substrate of diamond-like-carbon). In fact, un-doped polymers have relatively low number of electrons but transport electrons film the substrate very efficiently. This leaves a greet deal of scope for improvement by doping.

The polymer material may have envy levels which trap electrons serving to concentrate the electric field. In this way, field emission is promoted. In a preferred structure, the polymer material forms a film on a substrate comprising microcrystalline silicon. The grain boundaries at the poly-silicon surface trap large numbers of electrons as the surface becomes more n type, and so are able to concentrate the field at these points, promoting increased emission from the polymer film.

It is believed that in the material samples which led to the inventory initial discovery, voids observed on the material surface, believed to be due to solvent evaporation, serve to create lug local electric fields at certain parts of the field emission surface and to promote field emission.

However, a great advantage of the use of polymer materials is that many of them can be shaped by use of a mould. The term "mould" as used throughout this document must be understood to include any type of process in which the polymer is shaped by contact with an appropriately formed tool which is then removed and "moulding" is to be correspondingly constructed. By moulding the polymer's emission surface can be shaped such as to promote field emission, eg. by forming tips thereon.

In accordance with a further aspect of td present invention, theme is a field emission display having a cathode in accordance with the first aspect of the invention.

There are however other applications for the cathode.

At the low field strength which is sufficient to cause field emission from the cathode according to the present invention, emitted electrons may be insufficiently energetic to cause luminescence of a display screen. This problem is experienced when a phosphor screen is used.

Hence a preferred from of visual display device according to the present invention comprises a grid positioned with respect to the cathode such as to be capable of causing field emission therefrom, an acceleration anode positioned beyond the grid and a luminescent screen, wherein electrons are selectively emitted from the cathode under the influence of the grid and then accelerated onto the screen with sufficient energy to cause it to luminescence by the acceleration anode.

In accordance with a third aspect of the present invention, there is a method of fabricating a field emission cathode comprising forming a layer comprising conjugated polymer material on a subs the polymer material forming a field emission of the cathode.

The polymer material may be any of the polymer metals referred to above with respect to the first aspect of the invention.

Specific embodiments of the present invention will now be described, by way of example only, with reference to the accompanying drawings, in which:—

FIG. 2b is a graph of normalized field emission current density from a cathode according to the present invention in $A\ cm^{-2}$ and a logarithmic scale on the vertical axis against applied anode voltage on the horizontal axis. Results are shown for the three anode-cathode spacings mentioned above with reference to FIG. 2a;

A first specific embodiment of the invention comprises a field emission cathode firmed as a thick (5 $\mu m$), spin-cast, nominally undoped polymer (regioregular poly-3-octylthiophene-P3OT) which is capable of high, stable electron emission. The observed threshold field (0.2MV cm$^{-1}$) is the lowest so far reported among carbon based materials.

P3OT can be synthesized in pellets by the technique reported in Chen, T-A, Wu, X-M & Rieke, R. D.: Regio-controlled synthesis of poly (3-alkylthiophenes) medicated by Riezo inc: their characteristics and solid state properties, J. Am. Ch Soc. 117,233–244 (1995). However during a cared out by the inventors the material was purchased from a commercial source.

During trials, chloroform has been used as a solvent; dissolving 5 mg of P3OT in 1 ml of chloroform resulted in films of thickness 5 $\mu m$.

In initial tests the solution was cast onto a pre-cleansed 1 cm×1 cm highly doped n-Si substrate (resistivity 0.0030–

0.01 Ω cm) in a clean non-vacuum atmosphere. The optical Tauo bandgap was determined, at room temperature, to be ~1.75 eV by ultraviolet-visible spectrophotometry (this bandgap is defined as the intercept of the gradient of a $(\alpha E)^{1/4}$ versus E plot with the E axis where a is the absorption coefficient and E the photon energy). In addition, a single broad absorption maximum was obtained at -2.38 eV, which suggests that these "as synthesized" films are only slightly doped. Nuclear magnetic resonance measurements indicate a regular "head-tail" arrangement of the alkyl side chains (which can be thought of as a measure of how ordered the polymers are) of >90%. Such high regularity has only recently become available. It may not be essential for this application. Following casting the P3OT/n$^{++}$—Si devices were immediately placed in a vacuum of pressure ~$10^7$ torr to dry for 24 hours.

No special processes we introduced to eliminate the effects of light or air during preparation of the films. Hence in these initial trials they were invariably p type.

Figure 1:
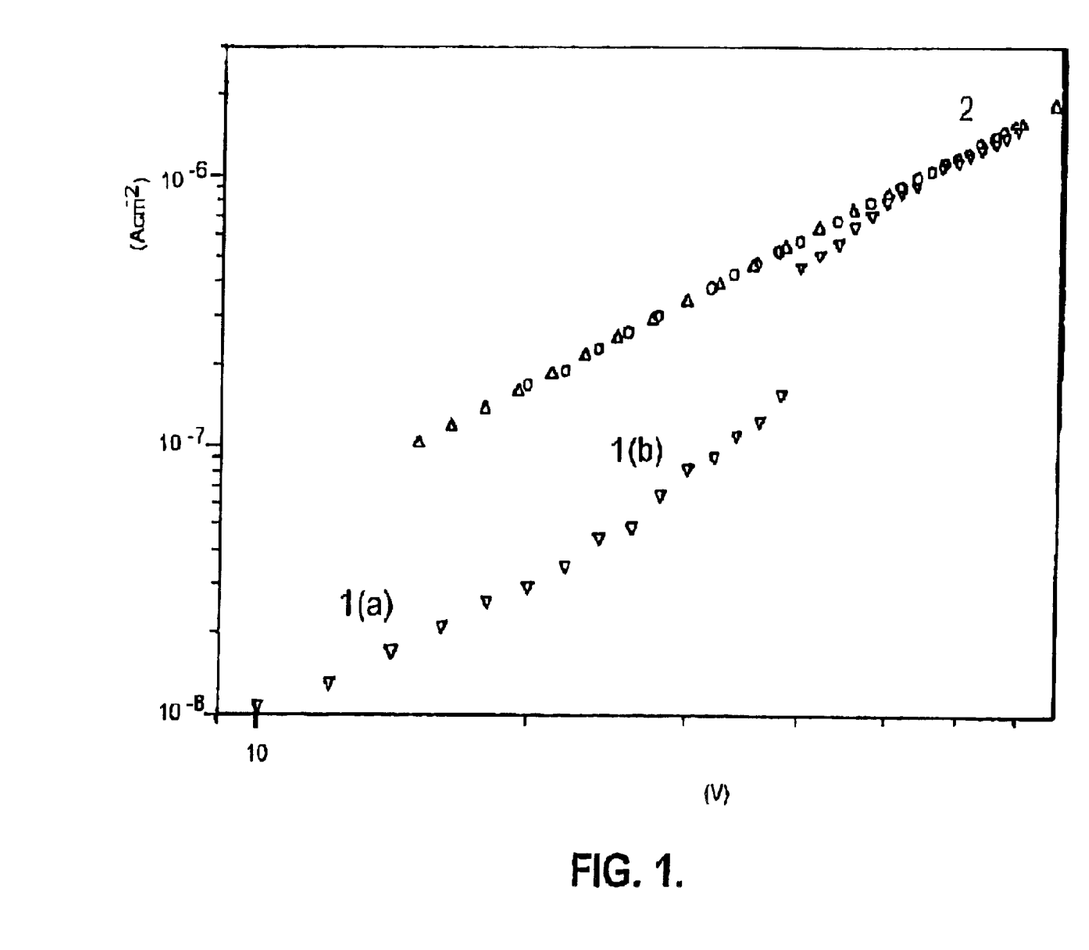
FIG. 1 is a graph of normalized or average field emission current density (on a logarithmic scale of $Acm^{-2}$ on the vertical axis) against applied voltage for a cathode embodying the preset invention.

Field-emission experiments have been carried out using cathodes formed in the above manner in the flat plate configuration with an indium tin oxide coated glass anode. The separation between the anode and cathode was varied between 27 $\mu$m and 130 $\mu$m using glass-fibre spacers. The pressure in the vacuum was ~$2\times10^{-7}$ torr. As with many carbon based materials it was necessary initially to ramp the anode voltage to a high level to achieve field emission—ie. to an the film. FIG. 1 shows typical current-voltage (I-V) characters. Two regions are clearly identified (called here 1 and 2). Regions 1a and 1b represent the emission before conditioning and region 2 is after conditioning. A highly sable and reproducible current level was maintained after conditioning. The conditioning field was always below 10V° m$^{-1}$ in order to avoid any influence of vacuum breakdown phenomena, which can occur at fields above 15V $\mu$m$^{-1}$ at the pressure used.

The results were found to be repeatable with or without the spacer being in contact with the ITO anode. Raising the pressure caused the emission current measured at the anode to fall to zero. The emission current was found to scale with the area of the film rather than its perimeter, indicating that edge effects were not dominant.

Figure 2A:
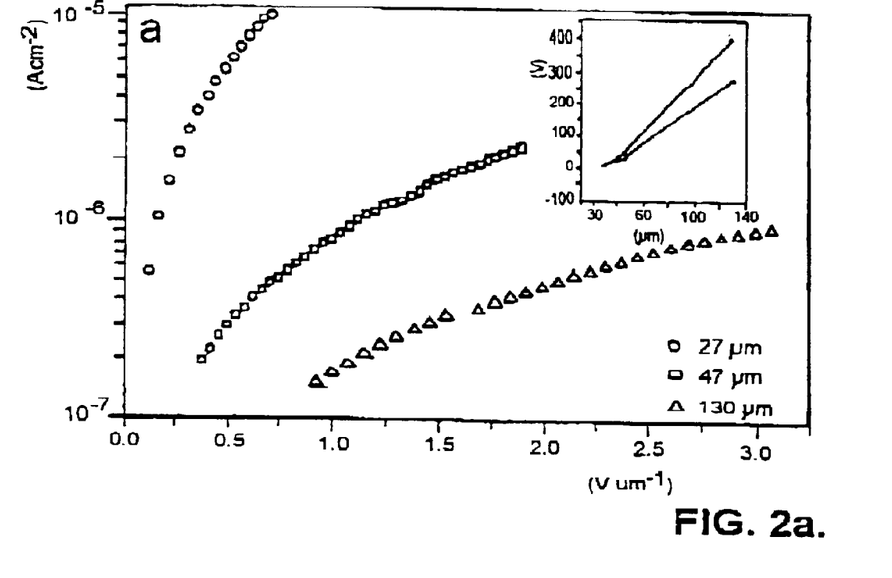
FIG. 2a is a graph of normalized field emission current density from a cathode according to the present invention in $A\ cm^{-2}$ a logarithmic scale on the vertical axis against normalized applied electric field on the horizontal axis, measured in volts per $\mu m$. Results are shown for throe anode-cathode spacings, the left-most line being for a spacing of 27 $\mu m$, the middle line for 47 $\mu m$ and the right-most line for 130 $\mu m$.
Figure 2B:
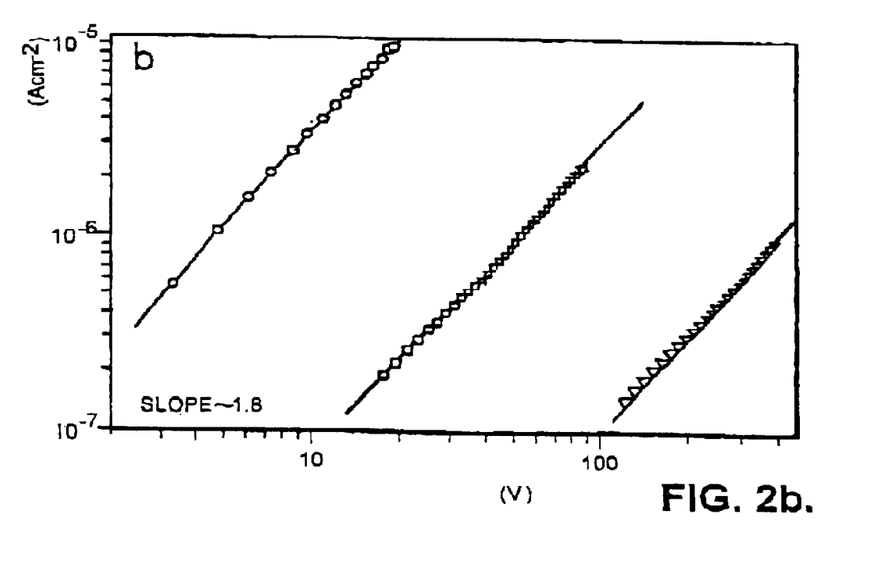

The remarkable current density (J)-electric field (F) characteristics, with threshhold field of only -0.2V $\mu$m$^{-1}$ for a current density of 1 $\mu$A cm$^{-2}$ are shown in FIG. 2a. FIG. 2b shows the J-F characteristics as a function of anode-cathode spacing. In addition a slope of 1.8 of the log I-log V plot indicates that a space-charge-limited current (SCLC) may be liming the emission process. The measured anode voltage versus gap separation is shown in FIG. 2a insert and indicates a nonlinear relationship. This shows that surface and bulk charge properties may be important to the emission process.

The surface morphology of the film was examined by a scanning electron microscopy (SEM) both before and after field emission. There was not explosive destruction of the film, which can be associated with discharge current phenomena during field emission. The polymer films show void-like features on the surface, of density ~$4\times10$ cm$^{-2}$ and of sizes raging from 0.40 $\mu$m to a few micrometers.

Figure 3:
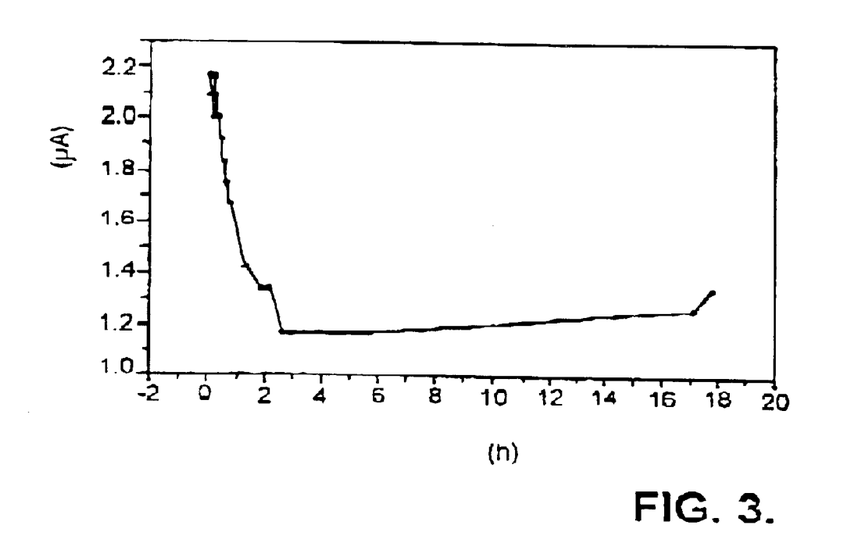
FIG. 3 is a graph of field emission current from a cathode according to the present invention in $\mu A$ on the vertical axis against time in hours on the horizontal axis.

The inventors also examined the stability of the emission current over time. The emission characteristic recorded over a 16 hour period of continuos emission is shown in FIG. 3. The initial current drops to 55% of its value in 2 hours, and thereafter remains stable. The sensitivity of the emission to a change in pressure was also examined: the emission current dropped to below 10 pA when the pressure rose to $10^{-3}$ torr.

An explanation of the current understanding of the physics of certain exemplary embodiments of the present invention is given below, but it must be understood that the inventors do not thereby intend to limit themselves to any particular model or theory explaining the operation of the present invention.

Figure 4:
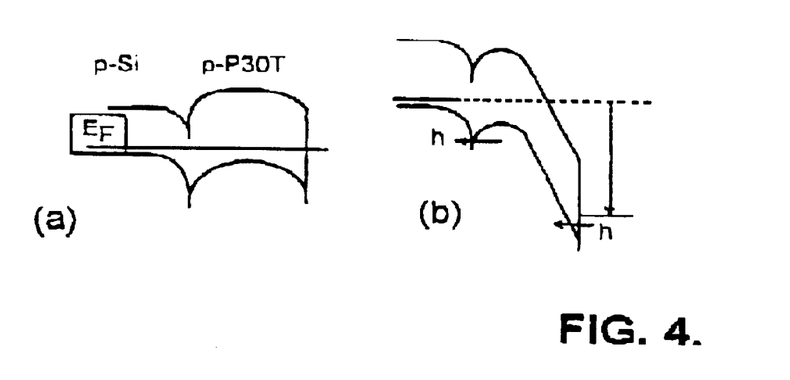
FIG. 4 shows band diagrams for a cathode according to the present invention comprising a P3OT layer on a p-Si substrate when subject to no bias (FIG. 4a) and when subject to a biasing field from an Al anode (FIG. 4b)

The band diagram of FIG. 4 for an aluminum anode predicts a very rapid rise of current which is observed with positive voltage on the aluminum. Space charge limited current kinks would be exposed with a high density of donor-like traps in the bottom half of the P3OT energy gap. Al gives excellent Schottky barriers on p-Si, with high on/off ratios.

The band diagram for the n substrate (FIG. 5) also predicts high forward currents, this time due to electrons. Now there is significant distortion due to the effects of trapped electrons in acceptor-like traps in the top half of the band gap. Only a single trapping level is apparent, although a second one could be the cause of the saturation of the current at abut $10^{-4}$ A. A second interpretation is considered less likely: a low density of state at the edge of the conduction band could, in principle, explain the dominance trapping and hence the presence of such distinct space charge limited effects.

The inventors conclude that the n-Si barrier is a reasonably efficient injector of electrons, that the effective lifetime of electrons in the polymer is, for minority carriers, surprisingly large. The high density of traps in the top half of the polymer energy gap is significantly higher than in the lower half.

Figure 5:
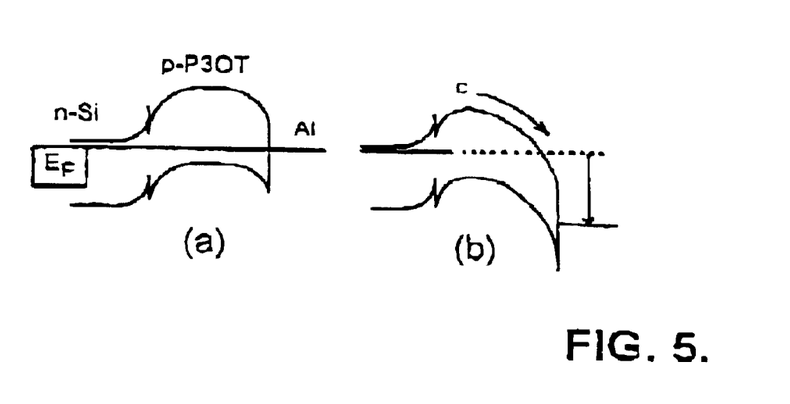
FIG. 5 shows band diagrams for a cathode according to the present invention comprising a P3OT layer on a n-Si substrate when subject to no bias (FIG. 5a) and when subject to a biasing field from an Al anode (FIG. 5b)
Figure 6:
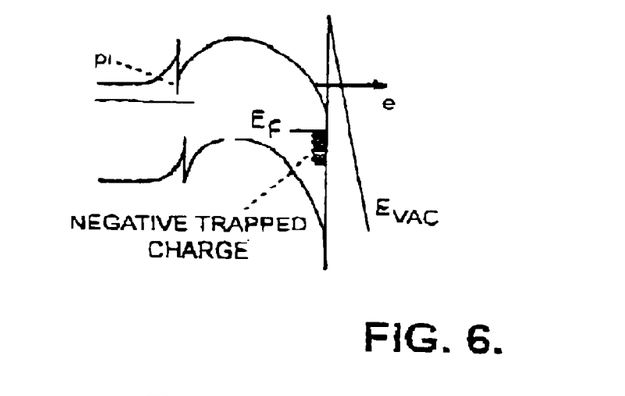
FIG. 6 is a band diagram a model for the field emission of electrons into the vacuum from a cathode according to the present invention.
Figure 7:
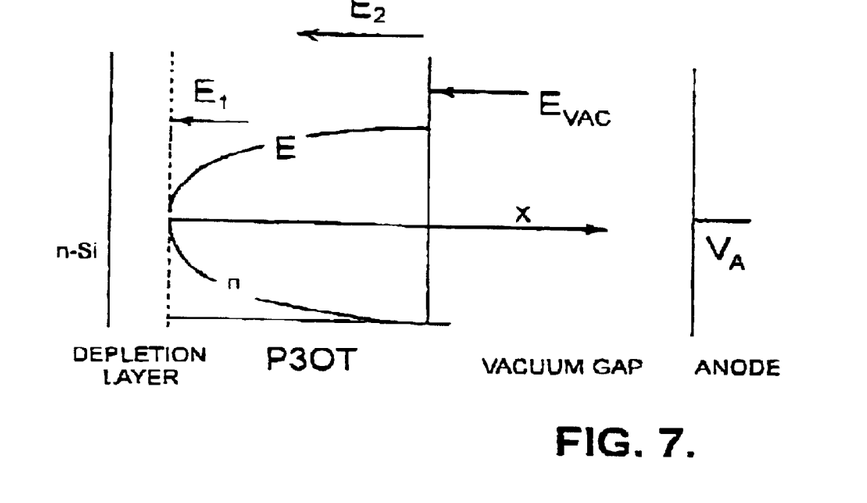
FIG. 7 represents a simple model of field emission from a cathode according to the invention.

A further condition must be met for efficient field emission there must be an efficient mechanism for injection of electrons into the vacuum. The electron affinity of polymer is low but positive. There is, therefore, a brier to electrons at the surface of the polymer. Electrons concentrate at this barrier, and most become trapped in the top half of the energy gap, close to the surface. There will therefore be significant curvature of the conduction band, with the Fermi level near to the conduction band c. This promotes electron emission via tunneling across the barrier (FIG. 6). Some of the electrons may travel ballistically across the narrow surface space charge region where they encounter a smaller tunneling distance. Further down the conduction band where the concentration off electrons is higher the tunnel distance is lower. FIG. 7 shows the proposed model in its simplest form. The electron density falls with distance from the silicon cathode, whilst the field increases to maintain nE and therefor the current density constant. Standard analysis of space charge limited currents in thin films gives.

$$Jx_f = (\Theta \mu \epsilon)(E_1^2 - E_2^2)$$

where $x_f$ is the film thickness, $\Theta$ is the ratio of the free to total electron concentration in the film, $\mu$ is the free electron mobility, $\epsilon = \epsilon_o \epsilon_r$ where $\epsilon_r$ is the relative permissively of the polymer and $\epsilon_o$ is the permittivity of free space. $E_1$, $E_2$ and $E_{vac}$ various field strengths defined in FIG. 5.

The field within the surface of the polymer and the field in the vacuum are related by:

$$\epsilon E_2 = \alpha \epsilon_o E_{vac}$$

where $\alpha$ is the field intensification multiplier just outside the polymer surface.

Figure 8:
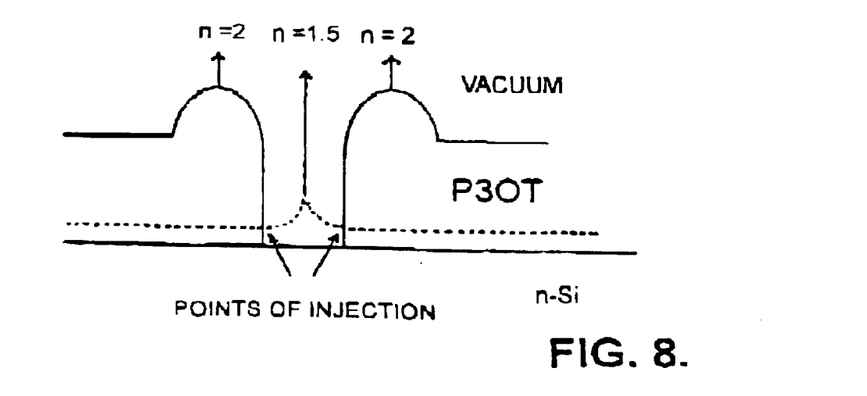
FIG. 8 schematically illustrated levels in the region of a void of the surface of a cathode according to the present invention.
Figure 9:
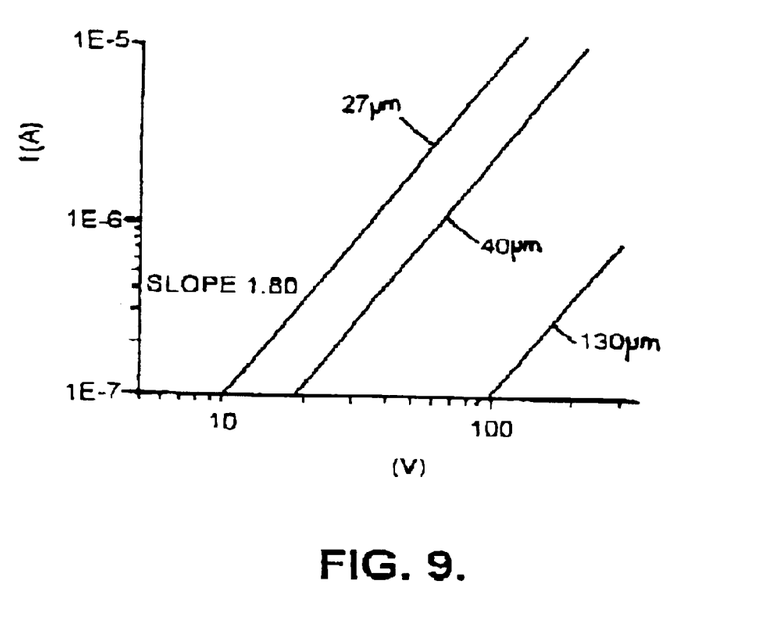
FIG. 9 is a graph of predicted field emission current (in a logarithmic scale as the vertical axis) against anode voltage on the horizontal axis assuming a simple one dimensional model for three different anode/cathode separations.

As mentioned above, there is evidence from AFM and SFM pictures that voids exist in the surface of films prepared in the way descried above. It is proposed that these voids arm the ee of the field intensification and that the electron current that flows has two components, one from the space charge limited behavior described above and a second due to free space charge within the void itself. Such a current would also be space charge limited obeying Child's Law. Both of these forms of space charge limited current have the form J$\alpha$ V$^n$ where n=1.5 in the case of vacuum (Child's Law) and n=2 with solids. The rim of the void is found to have a lip, shown schematically in FIG. 8, together with the regions where n=1.5 and n=2, The lip will act as an effective intensifier of the field Because the vacuum gap is much larger the film thickness the two forms of current must mix in this region and space charge in the vacuum due to Child's Law, in the region above the lips, will regulate the current from the n=2 region. Similarly abrupt changes of potential will not be possible between the lips and the adjacent space in the void—which is of the order of 1 $\mu$m in diameter or less. This will regulate current form the void. These effects are not amendable to ID analysis, so we make a simplifying assumption that the two current densities are equal, as are, approximately, the two areas of emission. The resulting current voltage plots are shown in FIG. 9 for the three vacuum gaps used in the field emission experiment. Although the plots accurately predict the slope of 1.8 for all three us, as well as for a range from 10V to 1 KV (not shown), there is a discrepancy in the thickness dependence.

Strictly speaking one would expect the simple analysis provided here to only apply for vacuum gaps comparable in size to the thickness of the polymer film. Extension to greater gap is the subject of 2D modeling.

Figure 10:
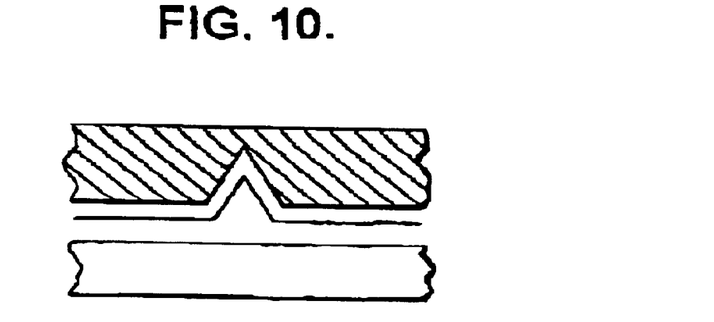
FIG. 10 illustrated a step in the process of moulding a polymer layer of a cathode according to the present invention, the cathode and mould being seen in cross section.

The inventors have speculated that the voids in the polymer film may be created by solvent evaporation during the manufacturing process. In working displays an alternative method of creating the necessary morphology is considered desirable and to this end the polymer film may be shaped against a mould. In such a process, the polymer material may be cast or centrifugally spun and thereby distributed over the substrate. A female mould, seen at 100 in FIG. 10, then pressed against the upper surface of the polymer 102. In FIG. 10, the substrate is seen at 104.

Polymers can be well suited to moulding processes.

In the illustrated embodiment, the mould is shape to form in the polymer a number of emission tips 106.

Figure 11:
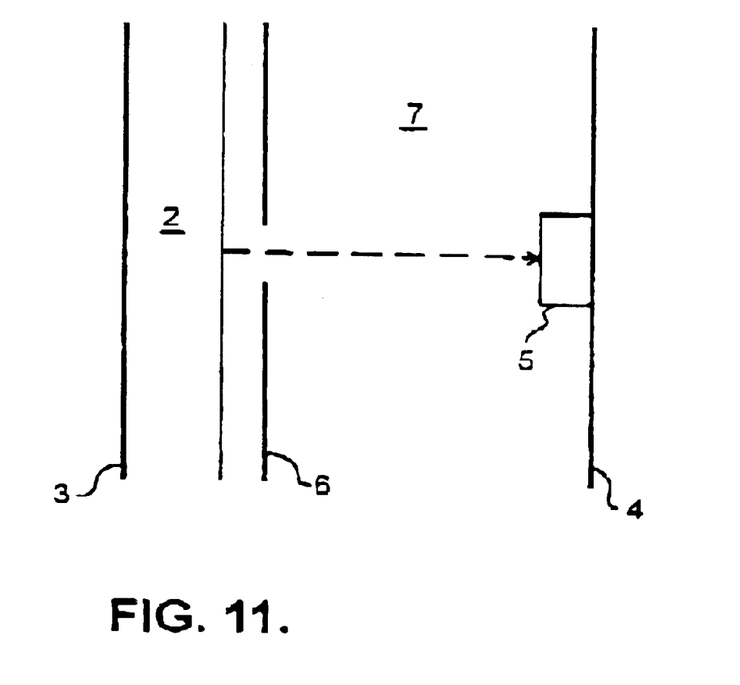
FIG. 11 illustrates in cross section a structure of a display device constructed in accordance with the present invention.
Figure 12:
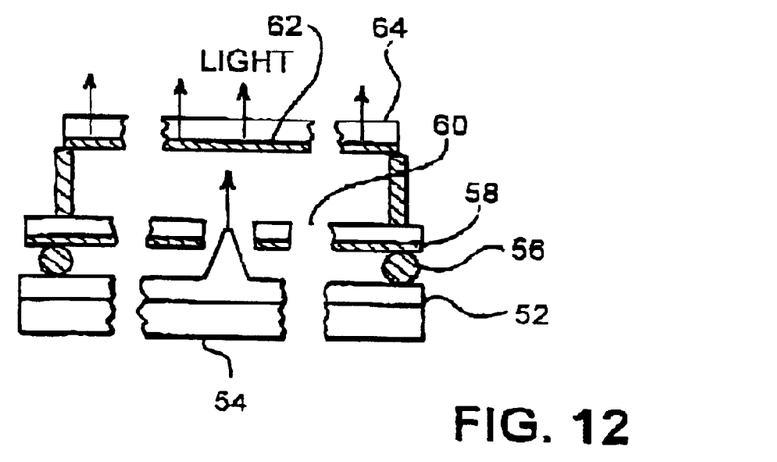
FIG. 12 illustrates in cross section a further structure of a display device according to the present invention.

Display devices embodying the present invention are illustrated in FIGS. 11 and 12.

In the simplified FED device structure illustrated in FIG. 11 the field emission cathode is a flat film 2 of polymer material disposed on a conducting substrate 3 maintained at low electrical potential. An anode 4 is provided in front of the cathode, and bears pixels 5 of a material which emits light when stuck by energetic electrodes, to produce the display. The anode may consist of a light emitting phosphor on glass. Between the anode and the code is a grid 6 which can be selectively positively charged. The space 7 between the anode and the cathode is a vacuum.

In operation of the selected regions of the grid 6 are charged positively (relative to the cathode) producing the field necessary for field emission of electrons from corresponding regions of the cathode. These electrons are accelerated through the grid by the electric field due to the anode 4, and strike the anode causing it to cunt light in selected regions of the screen.

A more detailed illustration of a suitable device structure is given in FIG. 12. Here the cathode is formed by a shaped polymer layer 52 on a substrate 54 which may be of glass. Spacers 56 separate the cathode from a conducting grid 58, penetrated by apertures 60 through which emitted electrons can reach a screen forming the anode and comprising a luminescent phosphor anode 62 on a glass substrate 64. Here it is the grid 59 which modulates the field emission (being positively charged relative to the cathode to the low voltage needed to produce field emission with the type of cathode described herein). The anode 62 is maintained at a higher voltage to accelerate the electrons sufficiently to cause the phosphor to luminesce with a required intensity.

What is claimed is:

1. A field emission apparatus comprising:
   a field emission cathode comprising a polymer material forming an exposed field emission surface; and
   an anode separated from said field emission cathode such as to be capable of causing field emission therefrom.

2. The field emission cathode of claim 1 wherein said polymer material is a conjugate polymer material.

3. The field emission cathode of claim 2 wherein said conjugated polymer material is a substituted polythiophene.

4. The field emission cathode of claim 2 wherein said conjugated polymer material is formed as a polymer layer on a substrate.

5. The field emission cathode of claim 4 wherein said polymer layer is formed from a polymer solution including a solvent, which is distributed on said substrate, said solvent being evaporated to leave behind said polymer layer.

6. The field emission cathode of claim 5 wherein said solvent is evaporated under vacuum.

7. The field emission cathode of claim 5 wherein a surface of said polymer layer includes voids which are formed by solvent evaporation.

8. The field emission cathode of claim 7 wherein said surface of said polymer layer is shaped by use of a mould.

9. The field emission cathode of claim 8 wherein said moulded surface of said polymer layer comprises a plurality of projections which promote field emission.

10. The field emission cathode of claim 2 wherein said conjugated polymer material is doped with an electron donor material.

11. A field emission apparatus comprising:
    a field emission cathode comprising a conjugate polymer material forming an exposed field emission surface; and
    an anode separated from said field emission cathode such as to be capable of causing field emission therefrom, wherein said conjugated polymer material comprises a polyalkylthiophene.

12. The field emission cathode of claim 11, wherein said conjugated polymer material comprises poly-3-octylthiophene.

13. The field emission cathode of claim 11 wherein said conjugated polymer material is formed as a polymer layer on a substrate.

14. The field emission cathode of claim 13 wherein said polymer layer is formed from a polymer solution including a solvent, which is distributed on said substrate, said solvent being evaporated to leave behind said polymer layer.

15. The field emission cathode of claim 14 wherein said solvent is evaporated under vacuum.

16. The field emission cathode of claim 14 wherein a surface of said polymer layer includes voids which are formed by solvent evaporation.

17. The field emission cathode of claim 16 wherein said surface of polymer layer is shaped by use of a mould.

18. The field emission cathode of claim 17 wherein said moulded ace of said polymer layer comprises a plurality of projections which promote field emission.

19. The field emission cathode of claim 11 wherein said conjugated polymer material is doped with an electron donor material.

20. A field emission display comprising:
   a field emission cathode comprising a conjugated polymer material forming a field emission surface;
   a first anode separated from said field emission cathode such as to be capable of causing field emission therefrom;
   a second anode positioned beyond said first anode; and
   a luminescent screen, wherein electrons are selectively emitted from said field emission cathode under the influence of said first anode then accelerated onto said screen with sufficient energy to cause it to luminesce by said second anode.

21. A method of fabricating a field emission cathode comprising the step of forming a polymer layer comprising conjugated polymer material on a substrate, said polymer material forming an exposed field emission surface of said field emission cathode.

22. The method of fabricating a field emission cathode of claim 21 further comprising the steps of:
   distributing a polymer solution including a solvent on said substrate, and
   evaporating said solvent to leave behind said polymer layer.

23. A method of fabricating a field emission cathode comprising the steps of:
   forming a polymer layer comprising conjugated polymer material on a substrate, said polymer material forming an exposed field emission surface of said field emission cathode; and
   distributing a polymer solution including a solvent on said substrate, and evaporating said solvent to leave behind said polymer layer, wherein said solvent is evaporated under vacuum.

24. The method of fabricating a field emission cathode of claim 23 further comprising the step of shaping the surface of the polymer layer by use of a mould.

* * * * *